United States Patent
Gooden

(10) Patent No.: US 9,377,578 B2
(45) Date of Patent: Jun. 28, 2016

(54) METHODS AND APPARATUS TO PROVIDE LIGHTING IN REFRIGERATORS

(71) Applicant: Whirlpool Corporation, Benton Harbor, MI (US)

(72) Inventor: Corey M. Gooden, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 65 days.

(21) Appl. No.: 14/207,982

(22) Filed: Mar. 13, 2014

(65) Prior Publication Data

US 2014/0268862 A1     Sep. 18, 2014

Related U.S. Application Data

(60) Provisional application No. 61/790,054, filed on Mar. 15, 2013.

(51) Int. Cl.
| | |
|---|---|
| F21V 33/00 | (2006.01) |
| F25D 27/00 | (2006.01) |
| F25D 21/02 | (2006.01) |
| F21V 7/04 | (2006.01) |
| G02B 6/00 | (2006.01) |
| G09F 13/00 | (2006.01) |
| F21V 11/00 | (2015.01) |
| G02B 5/02 | (2006.01) |
| H01J 5/16 | (2006.01) |
| H01P 5/00 | (2006.01) |
| F21V 8/00 | (2006.01) |
| F21K 99/00 | (2016.01) |

(52) U.S. Cl.
CPC ............... *G02B 6/0096* (2013.01); *F21K 9/52* (2013.01); *F25D 27/00* (2013.01)

(58) Field of Classification Search
CPC .... F21W 2131/305; F25D 27/00; F25D 27/005; F21V 33/0044; F21V 33/0012; G02B 6/0096
USPC .............................................. 362/92, 125, 126
See application file for complete search history.

(56) References Cited

U.S. PATENT DOCUMENTS

| | | | |
|---|---|---|---|
| 5,836,669 A | 11/1998 | Hed | |
| 6,179,434 B1 * | 1/2001 | Saraiji | ........................... 362/125 |
| 6,558,017 B1 | 5/2003 | Saraiji et al. | |
| 6,726,341 B2 | 4/2004 | Pashley et al. | |

(Continued)

FOREIGN PATENT DOCUMENTS

| | | |
|---|---|---|
| EP | 0971186 A | 1/2000 |
| EP | 0970642 B1 | 12/2000 |

(Continued)

OTHER PUBLICATIONS

European Search Report, dated Jul. 27, 2015, Patent No. 4160287 (European Search Report EP14160287) pp. 1-7.

*Primary Examiner* — Jong-Suk (James) Lee
*Assistant Examiner* — William N Harris

(57) ABSTRACT

Example methods and apparatuses to provide lighting in appliances are disclosed. An example refrigerator includes a compartment disposed within the refrigerator having first and second opposite side walls, a movable component disposed in the compartment, the movable component having a front edge, a light pipe extending along the front edge of the movable component, and a first light source positioned at the first side wall to emit light into a first end of the light pipe.

17 Claims, 5 Drawing Sheets

(56) References Cited

U.S. PATENT DOCUMENTS

| | | |
|---|---|---|
| 6,918,679 B2 | 7/2005 | Wu |
| 6,962,116 B2 | 11/2005 | Bienick et al. |
| 7,163,305 B2 | 1/2007 | Bienick |
| 7,201,487 B2 | 4/2007 | Pinter |
| 7,260,438 B2 | 8/2007 | Caldwell et al. |
| 7,413,321 B2 | 8/2008 | Kim et al. |
| 7,434,951 B2 | 10/2008 | Bienick |
| 7,628,525 B2 | 12/2009 | Lee et al. |
| 7,628,585 B2 | 12/2009 | Lee et al. |
| 7,670,018 B2 | 3/2010 | Kim et al. |
| 8,021,009 B2 | 9/2011 | Knoll et al. |
| 8,135,482 B2 | 3/2012 | Caldwell et al. |
| 8,186,844 B2 | 5/2012 | Hall |
| 8,322,873 B2 | 12/2012 | Glovatsky et al. |
| 2004/0062031 A1 | 4/2004 | Pinter |
| 2008/0121146 A1 | 5/2008 | Burns et al. |
| 2008/0236183 A1* | 10/2008 | Iimura ............................ 62/264 |
| 2009/0021927 A1 | 1/2009 | Hall et al. |
| 2011/0079034 A1 | 4/2011 | Kim et al. |
| 2011/0164399 A1* | 7/2011 | Driver et al. .................... 362/92 |
| 2012/0043338 A1* | 2/2012 | Yang et al. ............... 220/592.02 |
| 2012/0106129 A1* | 5/2012 | Glovatsky et al. ............. 362/92 |

FOREIGN PATENT DOCUMENTS

| | | |
|---|---|---|
| EP | 1887299 B1 | 2/2008 |
| JP | 2007032861 A | 2/2007 |
| WO | 2007041708 A1 | 4/2007 |
| WO | 2009132954 A2 | 11/2009 |
| WO | 2013017792 A1 | 2/2013 |
| WO | 2014069872 A1 | 5/2014 |

* cited by examiner

METHODS AND APPARATUS TO PROVIDE LIGHTING IN REFRIGERATORS

RELATED APPLICATION(S)

This application claims the priority benefit of U.S. Provisional Patent Application No. 61/790,054, filed on Mar. 15, 2013, the entirety of which is incorporated herein by reference.

FIELD OF THE DISCLOSURE

This disclosure relates generally to appliances such as, but not limited to, refrigerators, and more particularly to methods and apparatus to provide lighting in appliances.

BACKGROUND

Many appliances include lighting to assist in the viewing of items present, placed or stored in an appliance.

SUMMARY

Methods and apparatuses to provide lighting in appliances are disclosed. An example refrigerator includes a compartment disposed within the refrigerator having first and second opposite side walls, a movable component disposed in the compartment, the movable component having a front edge, a light pipe extending along the front edge of the movable component, and a first light source positioned at the first side wall to emit light into a first end of the light pipe.

An example movable component for use in an appliance includes a main body, a light pipe extending along a front edge of the main body, the light pipe having a diffuser and first and second opposite ends, and a first light reflector to direct light between a first light source embedded in a wall of the appliance and the first end of the light pipe.

An example method for lighting a portion of a refrigerator includes emitting light from a side wall of the refrigerator into a light pipe positioned along a front edge of a movable component of the refrigerator, and emitting the light from the light pipe into the portion of the refrigerator.

DETAILED DESCRIPTION

One of the problems with providing lighting or other features in appliances such as refrigerators relates to the use of electronics. When electronics are used within a cavity of an appliance, issues are presented regarding how to route power connections and/or other electrical connections to the electronics. Such problems are further complicated when movable/removable members such as, but not limited to, shelves, drawers, or bins have associated electronic components, assemblies, modules, etc. Although contacts or powered rails could be used to provide energy to the electronics on each member, such systems may be costly and/or complex to design and manufacture. To overcome at least these problems, methods and apparatus are disclosed herein that allow lighting to be efficiently provided within appliances.

Figure 1:
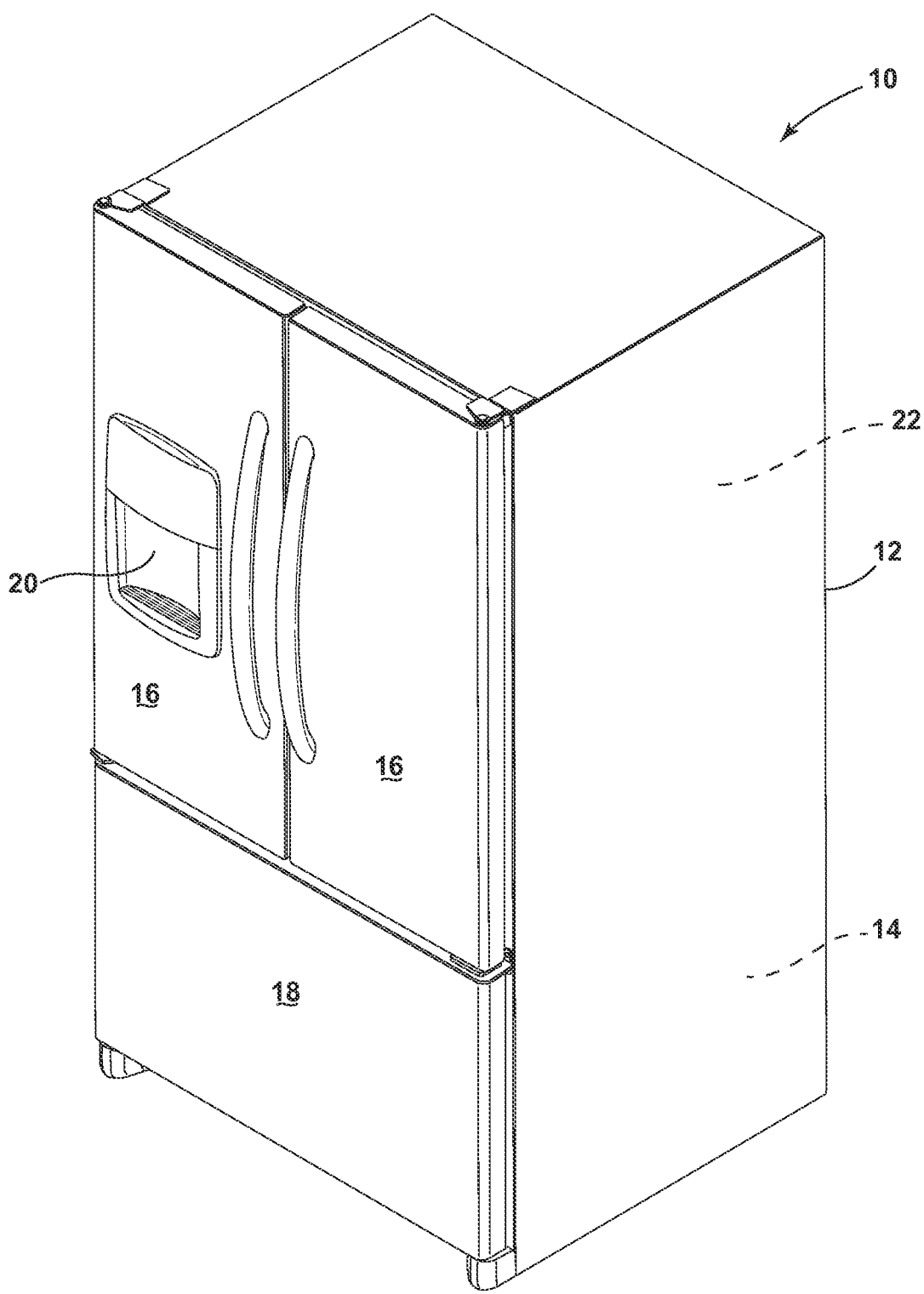
FIG. 1 illustrates an example prior-art refrigerator.

FIG. 1 illustrates an example prior-art refrigerator 10. The refrigerator 10 has a refrigerator cabinet or housing 12. The refrigerator 10 is a French door bottom mount refrigerator. The refrigerator 10 has a bottom mounted freezer and a freezer drawer 18 for providing access to a freezer compartment 14. The refrigerator 10 further includes a fresh food compartment 22 positioned above the freezer compartment 14 with French doors 16 to provide access to the fresh food compartment 22. A water and ice dispenser 20 is also shown. While not shown in FIG. 1 for simplicity, the water and ice dispenser 20 may include a user interface to enable a user to adjust, review and/or monitor one or more parameters of the refrigerator 10. For example, the user interface may be used to adjust and/or control whether light is emitted, or the intensity and/or color of light emitted by the example lighting disclosed herein. Alternatively, a user interface elsewhere in the refrigerator, for example, on shelf trim or a drawer front, may be used to adjust and/or control whether light is emitted, or the intensity and/or color of light emitted.

Although one particular style or configuration of refrigerator is shown in FIG. 1, it is to be understood that the methods, apparatus and systems disclosed herein may be used to provide lighting for any number of other styles or configurations of refrigerators including, but not limited to, side-by-side configurations, top-mounted freezer configurations, refrigerators with only a freezer compartment or only a fresh food compartment, refrigerators with reconfigurable space, refrigerators with additional compartments, or other configurations. In addition, the methods, apparatus and systems disclosed herein may be used to provide lighting for any other types of appliances including, but not limited to, standalone ice makers, dishwashers, washing machines, dryers, microwaves, ovens, shelving units, storage units, or any other apparatus, device, installation, or appliance for which lighting is desired.

Figure 2:
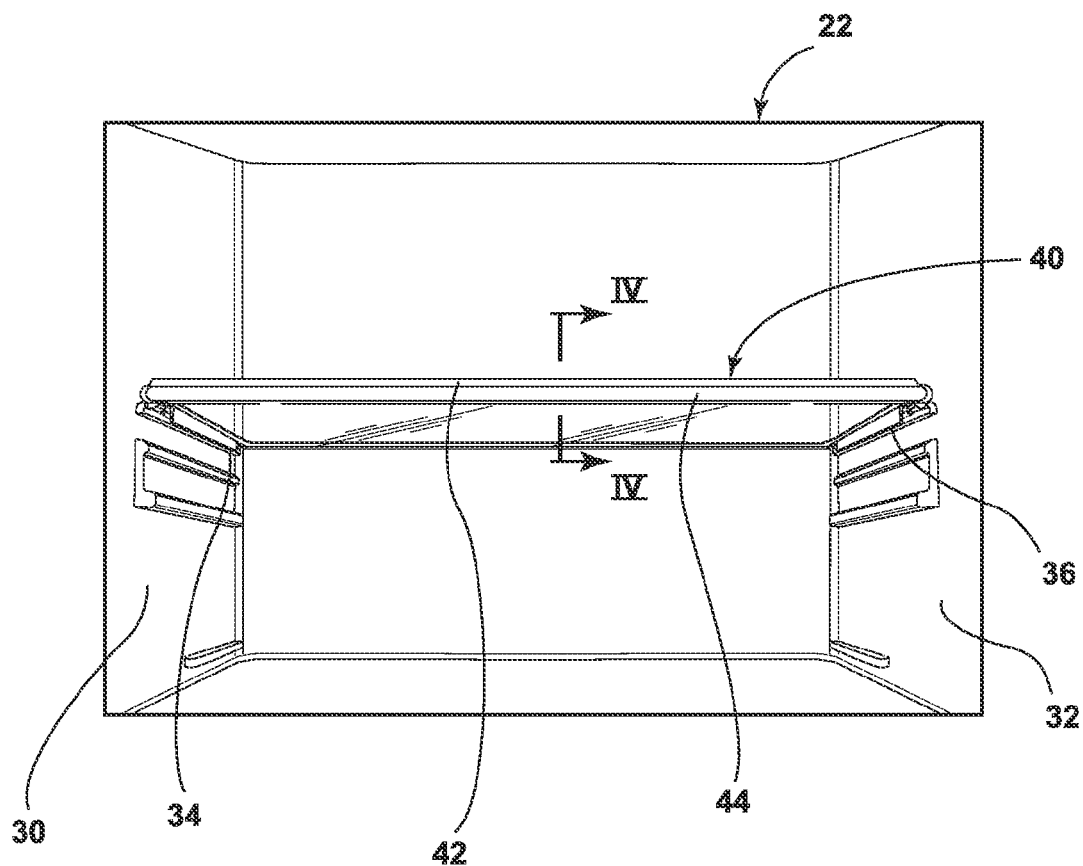
FIG. 2 illustrates an example refrigerator compartment including an example shelf having a light pipe constructed in accordance with the teachings of this disclosure.

FIG. 2 illustrates an interior of the fresh food compartment 22 of FIG. 1 including an example shelf 40 having lighting constructed in accordance with the teachings of this disclosure. The fresh food compartment 22 has first and second opposite side walls 30, 32. To support the example shelf, the fresh food compartment 22 includes first and second opposite shelf supports 34, 36 attached to respective ones of the side walls 30, 32. In some examples, two shelves 40 may used to span the compartment 22. In such examples, there may be one or more brackets or other supports in the middle of compartment to support inner sides of the shelves 40. The example shelf 40 of FIG. 2 may be removed and/or repositioned elsewhere within the interior of the fresh food compartment 22 such as on a different set of shelf supports.

Figure 3:
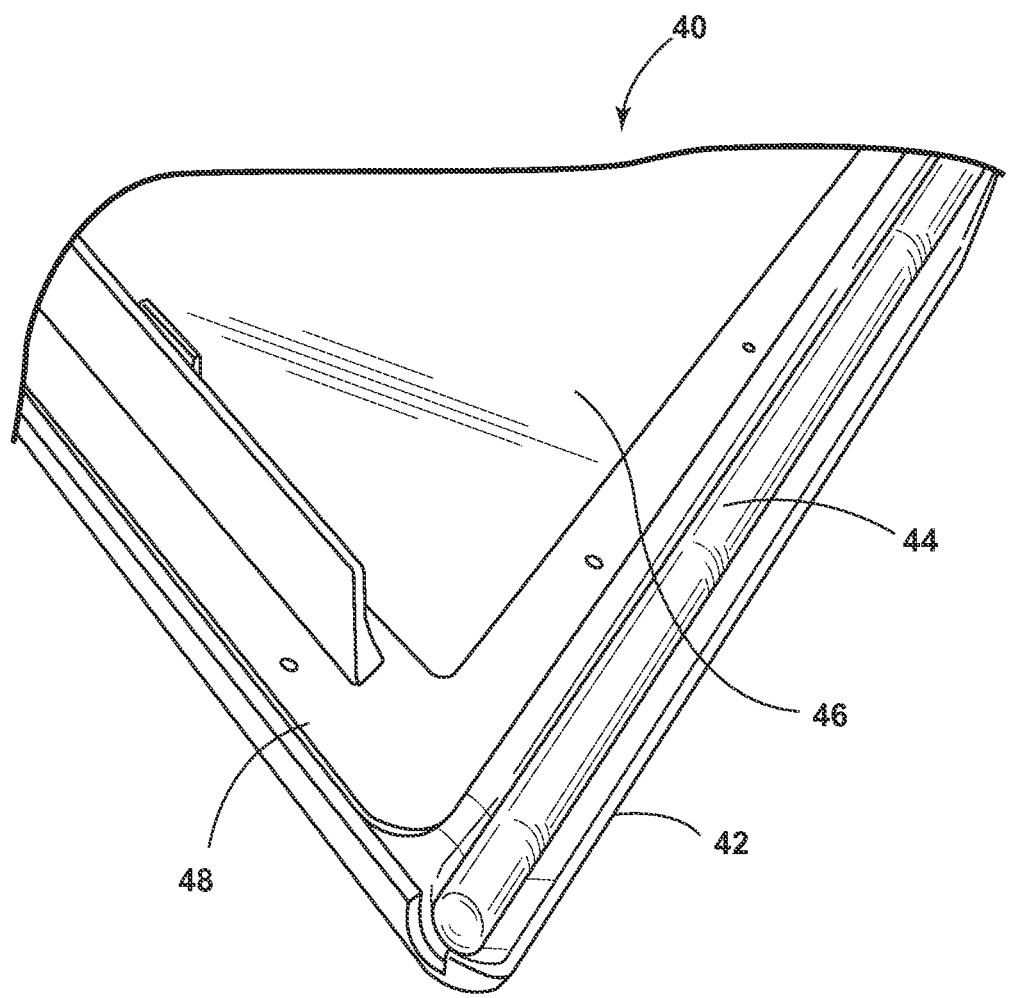
FIG. 3 is a bottom view of a portion of the example shelf of FIG. 2.
Figure 4:
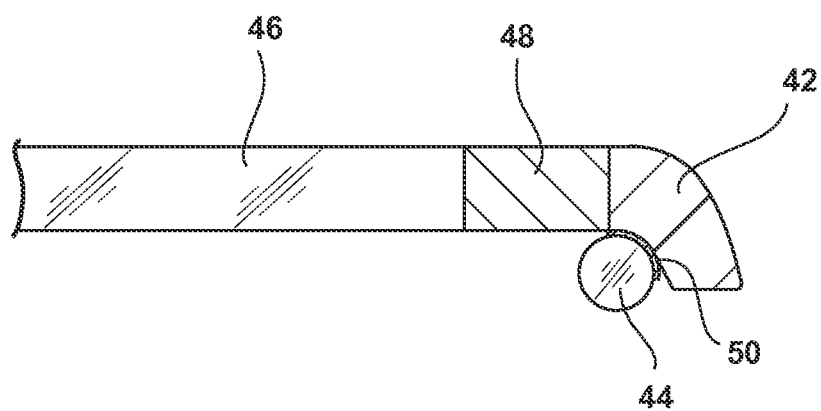
FIG. 4 is a cross section view of the example shelf of FIG. 2 taken along line 4-4 of line 2.
Figure 5:
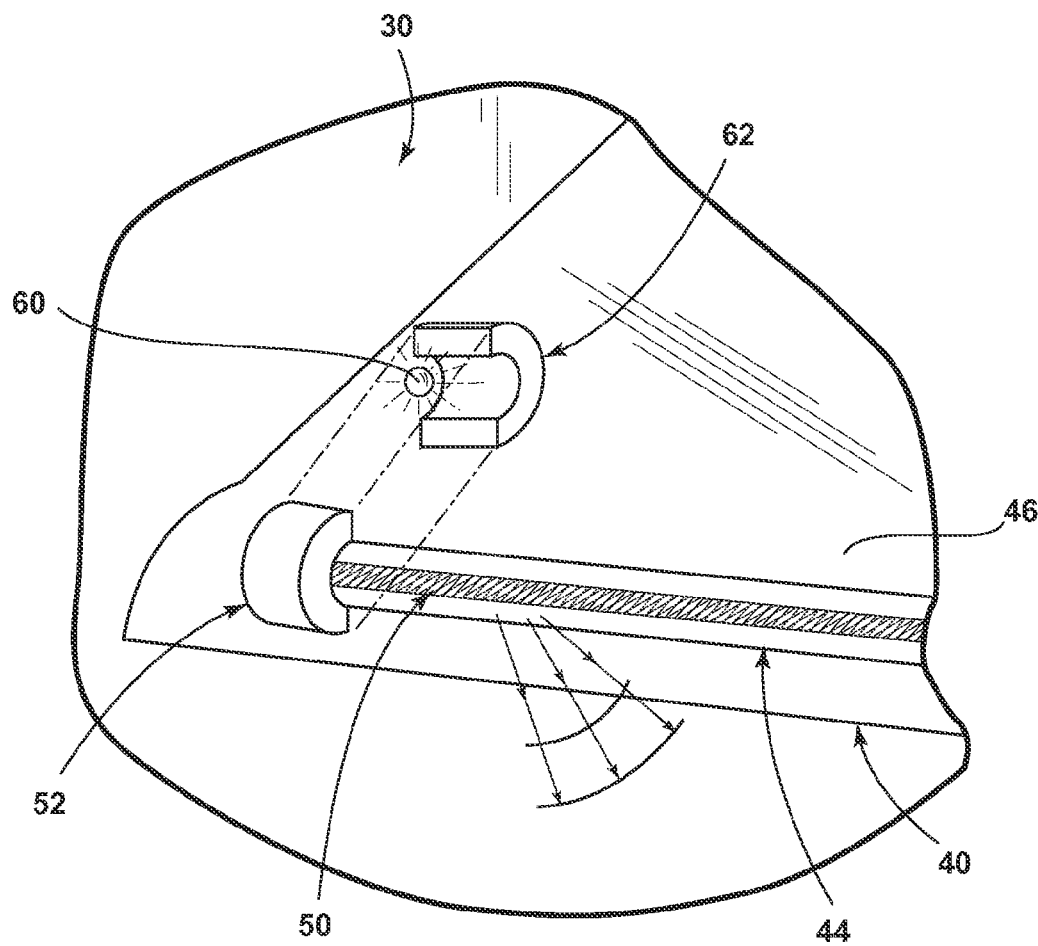
FIG. 5 illustrates an example coupling of the example shelf of FIGS. 2-4 to a side wall of the example compartment of FIG. 2.

As shown in FIGS. 2-4, the example shelf 40 has front trim or a front surface 42 with a light pipe 44 extending along the front trim 42 of the shelf 40. The example light pipe 44 of FIGS. 2-4 extends underneath the front trim 42 of the shelf 40, or a shelf handle. Alternatively, the light pipe 44 may extend above or in front of the front trim 42 and/or handle. The light pipe 44 may be attached to the front trim 42 and/or be partially or wholly embedded within the front trim 42. In some examples, the light pipe 44 has a diffuser that may be, for example, printed thereon, physically scored into, adhered to, or coated onto. The diffuser can be either over the entire light pipe to effect a substantially even lighting effect, or in small sections using various shapes/sizes to, for example, emitted light in particular directions. As shown in FIGS. 4 and 5, the light pipe 44 may additionally or alternatively have a reflector 50 longitudinally extending along the reflector 50 that reflects light into the compartment 22. The light pipe 44 can be attached to, for example, a movable bin, a movable drawer, a handle, a movable shelf, in stationary locations that the customer is not intended to move, etc. As best shown in FIG. 5, when the example shelf 40 is fully positioned within the compartment 22, one or both ends of the light pipe 44 are positioned opposite, or aligned with respective light sources 60 (FIG. 5) placed on, positioned at, embedded within, etc. the side walls 30 and 32. Light emitted by the light source(s) 60 passes into the light pipe 44 and is subsequently emitted into the compartment 22. Alternatively, the light sources 60 may be positioned such that light is emitted from a light pipe of a movable component, such as a bin or drawer, when the movable component is at least partially opened. For example, an interior of drawer, a dispensing bin of a washing machine, etc. may be illuminated when in an at least partially open position.

FIG. 3 is a bottom view of the example shelf 40 of FIG. 2. As shown in FIG. 3, the example shelf 40 has a main body 46 which may be formed of glass, clear plastic, or any other transparent, semi-transparent, or opaque material. In the example of FIG. 3, there is trim 48 that surrounds edges of the main body 46. It is to be understood that the trim 48 need not surround all edges of the main body 46. The light pipe 44 is shown extending underneath the front trim 42. In some examples, the shelf 40 does not either the trim 48 or the front trim 42 at a front edge of the shelf 40. In such examples, the light pipe 44 may be embedded into and/or formed as part of the main body 46. Alternatively, the trim 48 and the front trim 42 may be combined into a single component. Thus, in general, the light pipe 44 extends across a front edge of the shelf 40 regardless of whether the front edge is formed by the front trim 42, a combined front trim 42 and trim 48 component, or the main body 46.

FIG. 5 provides another view of the example shelf 40 of FIGS. 2-4 with the example light pipe 44. The light pipe 44 has a reflector 50 and, additionally or alternatively, a printed diffuser or physical scoring (not shown for simplicity). Light is ejected or emitted from the light pipe 44 opposite the reflector 50, if it is present. If a diffuser is included it will improve the uniformity of light emitted from the light pipe 44. In some examples, the light pipe 44 includes neither a reflector nor a diffuser. The shelf 40 may include a connector 52 which is attached to the light pipe 44 and/or to the shelf 40 and provides for reflecting, guiding, directing or transmitting light from a light module or light source 60 into the light pipe 44.

The light module or light source 60 may be, for example, a light emitting diode (LED) or an LED array. In some examples, the light source 60 may be selectively controlled to emit different intensities and/or colors of light. In the example of FIG. 5, the light source 60 is an LED module embedded in the side wall 30 of the compartment 22 and is positioned to be aligned with the light pipe 44 when the shelf 40 is fully positioned within the compartment 22. One or both ends of the light pipe 44 may include a lens, a concave surface, a convex surface, a flat surface, and/or a shiny surface to improve the coupling of light from the light source 60 into the light pipe 44.

A refrigerator supporting the example shelf 40 disclosed herein may include a controller or control system to control operation of the light source 60 in response to one or more events. Example events include, but are not limited to, a user action, opening of the refrigerator, proximity of the user to the shelf, contact of the user with the shelf, etc. The light source 60 may be on when the door is open regardless of whether the shelf 40 is installed, or may be configured to only illuminate when the light pipe 44 is in place. The controller and/or control system may adjust the intensity and/or color of light emitted from the light pipe 44 in response to one or more inputs received, for example, via the user interface of the ice and water dispenser 20.

A light reflector 62 is shown which may be opaque and formed of plastic to block light from the light source 60 from illuminating the back portion of the shelf 40. Thus, light from the light source 60 may be more fully directed towards the light pipe 44 to illuminate the light pipe 44. In some examples, to the reflector 62 focuses the light into the pipe 44 when the shelf 40 is in place. The example reflector 62 also hides the light source 60 from being directly visible. These features allow for aesthetic purposes to prevent bright spots at the edge of the light pipe 44, which may distract from the aesthetic benefits of the light pipe 44 with reflector 50. The connector 52 may also be a light reflector operating similarly to the light reflector 62. In some examples, the connector 52 and the light reflector 62 form a light reflector and light director.

Thus, instead of trying to safely get energy to movable members in the cavity of an appliance to power electronics in the movable members, the use of light pipes under a movable member keeps the electronics stationary and directs the light where it is desired. Therefore, targeted lighting may be provided in a manner that eliminates the need to specifically route electronics within the cavity of an appliance. The light modules may be embedded into the side walls of the refrigerator as they are and the light may be routed using light pipes, which may have a reflector and/or a diffuser to selectively direct light where it is desired.

Although described primarily in terms of a refrigerator with a shelf or shelf handle, it is to be understood that the same or similar structures with the same or similar functionality may be used otherwise. For example, instead of a shelf, the lighting may be provided in a bin or drawer of a refrigerator, or other stationary or removable component of an appliance.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A refrigerator comprising:
   a compartment disposed within the refrigerator having first and second opposite side walls;
   a movable component disposed in the compartment, the movable component having a front edge;
   a light pipe extending along the front edge of the movable component;
   a first light source positioned at the first side wall to emit light into a first end of the light pipe; and
   a first light reflector positioned between the first light source and the first end of the light pipe; wherein the first light reflector comprises a first portion mounted to the movable component and a second portion mounted to the first side wall, wherein the first and second portions are configured to be mated based on a location of the movable component and wherein the first light reflector hides the first light source from being visible to a user of the refrigerator when the first and second portions are mated;

and wherein the first and second portions are each generally semicircular in shape, which when mated form a generally circular connector.

2. A refrigerator as defined in claim 1, wherein the first light reflector is configured to direct light between the first light source and the first end of the light pipe.

3. A refrigerator as defined in claim 1, wherein the movable component is a shelf, a basket or a bin.

4. A refrigerator as defined in claim 1, wherein the light pipe comprises at least one of a reflector longitudinally extending along the light pipe, or a diffuser for directing light.

5. A refrigerator as defined in claim 1, wherein the first end of the light pipe comprises at least one of a lens, a concave surface, a convex surface, a highly reflective surface or a flat surface.

6. A refrigerator as defined in claim 1, further comprising a second light module positioned at the second side wall to emit light into a second end of the light pipe.

7. A refrigerator as defined in claim 1, wherein the first light source comprises a light emitting diode.

8. A refrigerator as defined in claim 1, wherein when the movable component is fully positioned within the compartment the first light source is aligned with the first end of the light pipe.

9. A refrigerator as defined in claim 1, wherein when the movable component is partially positioned within the compartment the first light source is aligned with the first end of the light pipe.

10. A refrigerator as defined in claim 1, wherein the compartment comprises a refrigerated food compartment or a freezer compartment.

11. A refrigerator as defined in claim 1, further comprising a control system operatively connected to the first light source and adapted to operate the first light source in response to an event.

12. A refrigerator as defined in claim 11, wherein the event comprises at least one of a user action, an opening of the refrigerator, a proximity of a person to the movable component, or a contact of the user with the movable component.

13. A refrigerator as defined in claim 1, wherein the first light source is embedded in the first side wall.

14. A movable component for use in a refrigerated appliance, comprising:
a main body disposed in the refrigerated appliance;
a light pipe extending along a front edge of the main body, the light pipe comprising:
a diffuser; and
first and second opposite ends; a first light source configured to be embedded in a wall of the refrigerated appliance; and
a first light reflector configured to direct light between the first light source and the first end of the light pipe; wherein the first light reflector comprises a first portion mounted to the main body and a second portion configured to be mounted to a first side wall of the refrigerated appliance, wherein the first and second portions are configured to be mated based on a location of the movable component and wherein the first light reflector hides the first light source from being visible to a user of the refrigerated appliance when the first and second portions are mated;
and wherein the first and second portions are each generally semicircular in shape, which when mated form a generally circular connector.

15. A movable component as defined in claim 14, wherein the light pipe is at least one of attached beneath the front edge, attached in front of the front edge, attached above the front edge, attached beneath trim attached to the main body at the front edge, attached to a handle attached to the main body at the front edge, embedded in the main body at the front edge, or formed as part of the main body.

16. A movable component as defined in claim 14, wherein the movable component is a shelf, a bin, or a basket.

17. A method for lighting a portion of a refrigerator, the method comprising:
emitting light from a side wall of the refrigerator into a light pipe positioned along a front edge of a movable component of the refrigerator; and
emitting the light from the light pipe into the portion of the refrigerator;
directing light through a first light reflector between a first light source embedded in a wall of the refrigerator and a first end of the light pipe; wherein the first light reflector comprises a first portion mounted to a main body of the refrigerator and a second portion mounted to a first side wall of the refrigerator, mating the first and second portions based on a location of the movable component and wherein the first light reflector hides the first light source from being visible to a user of the refrigerator when the first and second portions are mated;
and wherein the first and second portions are each generally semicircular in shape, which when mated form a generally circular connector.

* * * * *